United States Patent [19]

Terashima et al.

[11] Patent Number: 4,840,082
[45] Date of Patent: Jun. 20, 1989

[54] LEVER SYSTEM FOR VEHICLES

[75] Inventors: Hideyuki Terashima; Yasuhiko Tsuchiya, both of Ueda, Japan

[73] Assignee: Nissin Kogyo Kabushiki Kaisha, Ueda, Japan

[21] Appl. No.: 201,239

[22] Filed: Jun. 2, 1988

[30] Foreign Application Priority Data

Jun. 5, 1987 [JP] Japan ................................ 140780
Jun. 5, 1987 [JP] Japan ............................ 87422[U]

[51] Int. Cl.[4] .............................................. G05G 1/04
[52] U.S. Cl. ....................................... 74/523; 74/489; 74/525
[58] Field of Search .............. 74/523, 489, 488, 502.2, 74/531, 522, 525, 526

[56] References Cited

U.S. PATENT DOCUMENTS

| 4,222,285 | 9/1980 | Kine ...................................... 74/489 |
| 4,263,818 | 5/1981 | Ozaki .................................... 74/489 |
| 4,560,049 | 12/1985 | Uchibaba ............................ 192/99 |

FOREIGN PATENT DOCUMENTS 173513  3/1986  European Pat. Off. .............. 74/523
2434300 of 1976  Fed. Rep. of Germany ........ 74/489
689430 of 1930  France .................................. 74/488
59-216777  2/1983  Japan .
59-128483  5/1983  Japan .

Primary Examiner—Gary L. Smith
Assistant Examiner—Flemming Saether
Attorney, Agent, or Firm—Armstrong, Nikaido, Marmelstein, Kubovcik & Murray

[57] ABSTRACT

In a lever system for vehicles, comprising an operating element for operating a master cylinder, an operating lever for actuating the operating element, the operating element and the operating lever being mounted on a lever holder attached to a steering handle, and an adjusting means interposed between the operating element and the operating lever for adjusting the distance between the operating lever and the steering handle, the operating element is pivotally supported on the lever holder through a first support shaft, and the operating lever is pivotally supported on the operating element through a second support shaft. This makes it possible to improve the fitting strength and assembling of the operating lever and the operating element without degradation of the appearance.

5 Claims, 6 Drawing Sheets

LEVER SYSTEM FOR VEHICLES

BACKGROUND OF THE INVENTION

1. Field of the Invention

The present invention relates to a lever system for use in operation of a master cylinder for actuating a brake, a clutch or the like of a vehicle such as a motorcycle, and particularly to an improvement of a lever system comprising an operating element for operating a master cylinder, an operating lever for actuating the operating element, the operating element and the operating lever being mounted on a lever holder attached to a steering handle, and adjusting means interposed between the operating element and the operating lever for adjusting the distance between the operating lever and the steering handle.

2. Description of the Prior Art

There is conventionally known a lever system of this type in which the operating element and the operating lever are supported on the lever holder through a common support shaft (see Japanese Patent Application Laid-open No. 216777/84).

The prior art lever system is advantageous in that the use of the operating element makes it possible to adjust the distance between the operating lever and the steering handle without variation in working stroke of the brake or the like. However, the prior art lever system is accompanied by the following problems; because the operating element and the operating lever are mounted in superposition on the common support shaft, if the wall thicknesses of fitting portions of the operating element and the operating lever are increased in order to improve their fitting strength, the axial thickness of the support shaft at the superposed portion is increased to provide a poor appearance. In addition, the operating element and the operating lever with the adjusting means interposed therebetween must be attached to the lever holder, resulting in a degraded ease of assembling.

SUMMARY OF THE INVENTION

It is an object of the present invention to provide a lever system wherein the above problems can be overcome.

To accomplish the above object, according to the present invention, there is provided a lever system for vehicles, comprising an operating element for operating a master cylinder, an operating lever for actuating the operating element, the operating element and the operating lever being mounted on a lever holder attached to a steering handle, and adjusting means interposed between the operating element and the operating lever for adjusting the distance between the operating lever and the steering handle, wherein the operating element is pivotally supported on the lever holder through a first support shaft, and the operating lever is pivotally supported on the operating element through a second support shaft.

With such construction, the support shafts for the operating element and the operating lever are separate and hence, even if the wall thicknesses of their fitting portions are increased in order to improve the fitting strength of the operating element and the operating lever, the axial length of each of the support shafts need not be increased as much, and this provides a good appearance.

In addition, the operating element and the adjusting means can be assembled to the operating lever to form a single unit, leading to an improvement of ease of assembling the operating element, the operating lever and the adjusting means to the lever holder.

The above and other objects, features and advantages of the present invention will become apparent from reading of the following description of the preferred embodiments, taken in conjunction with the accompanying drawings.

DESCRIPTION OF THE DRAWINGS

FIG. 1 is a general plan view;

FIG. 2 is a sectional view taken along a line II—II in FIG. 1;

FIG. 3 is a sectional view taken along a line III—III in FIG.1;

FIG. 4 is a view taken in a direction of an arrow IV in FIG. 2;

FIG. 5 is an exploded perspective view of details;

FIG. 7 is a general plan view similar to FIG. 1; and

FIG. 8 is an exploded perspective view of details, similar to FIG. 5.

DESCRIPTION OF THE PREFERRED EMBODIMENTS

Figure 1:
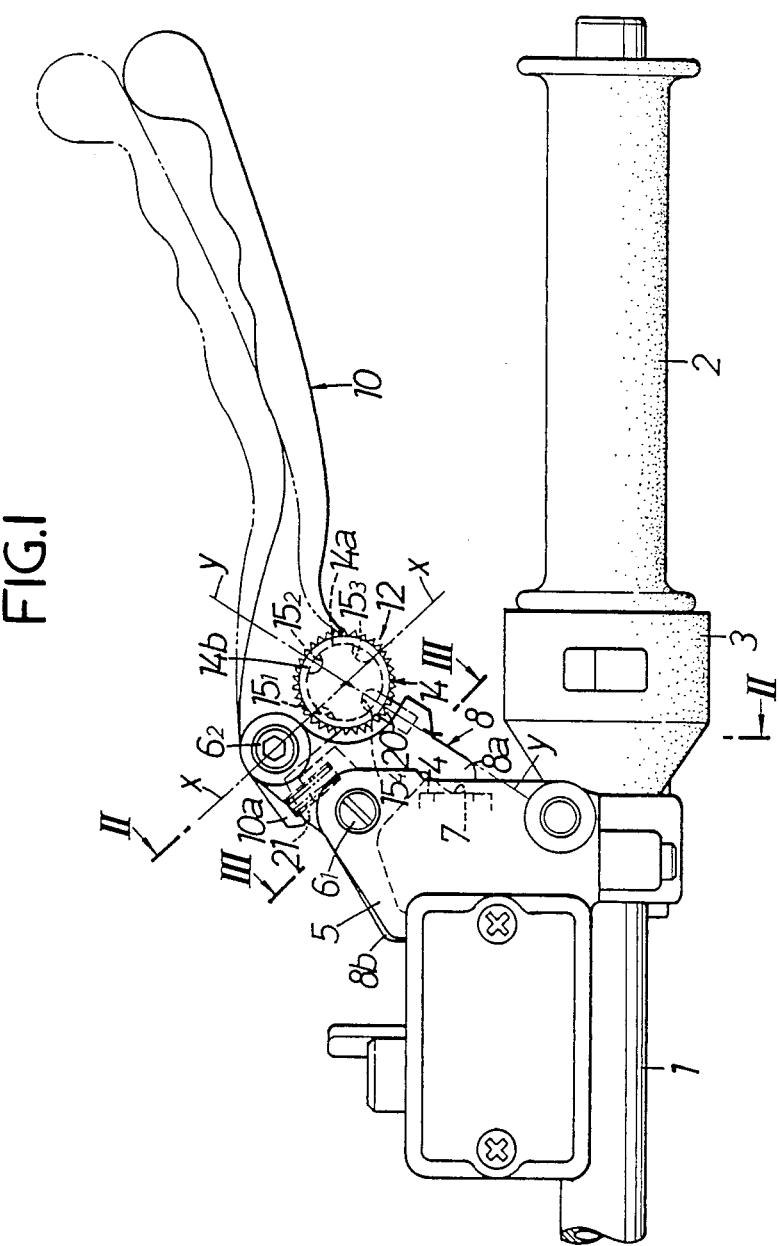
FIGS. 1 to 5 illustrate a first embodiment of the present invention.
Figure 2:
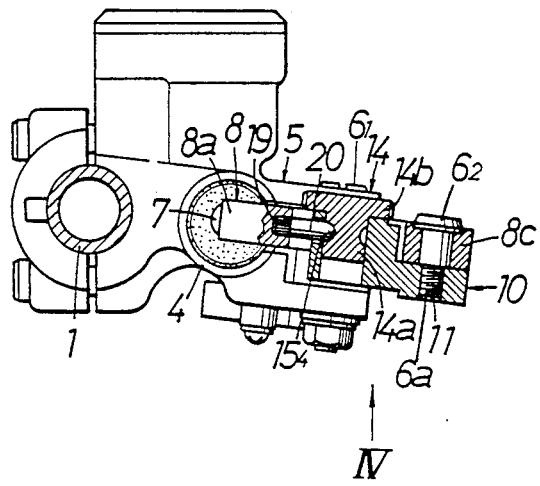
Figure 3:
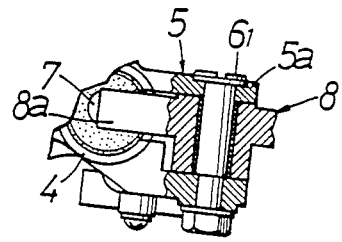

FIGS. 1 to 5 illustrate a first embodiment of the present invention applied in a front wheel brake system of a motorcyle. Referring to FIGS. 1 and 2, a steering handle 1 includes a throttle grip 2 at an outer end thereof and a combination switch 3 at an inner portion thereof.

A lever holder 5 for a master cylinder 4 is mounted on the steering handle 1 adjacent the combination switch 3. As clearly shown in FIG. 3, a first support shaft $6_1$ is mounted, with its axis directed vertically, on a bifurcated end 5a of the lever holder 5 which is forward of a vehicle, and an operating element 8 for actuating a working piston 7 is pivotally supported on the first support shaft $6_1$.

Figure 4:
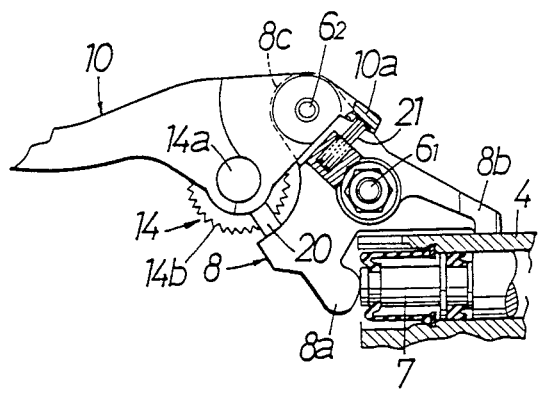
Figure 5:
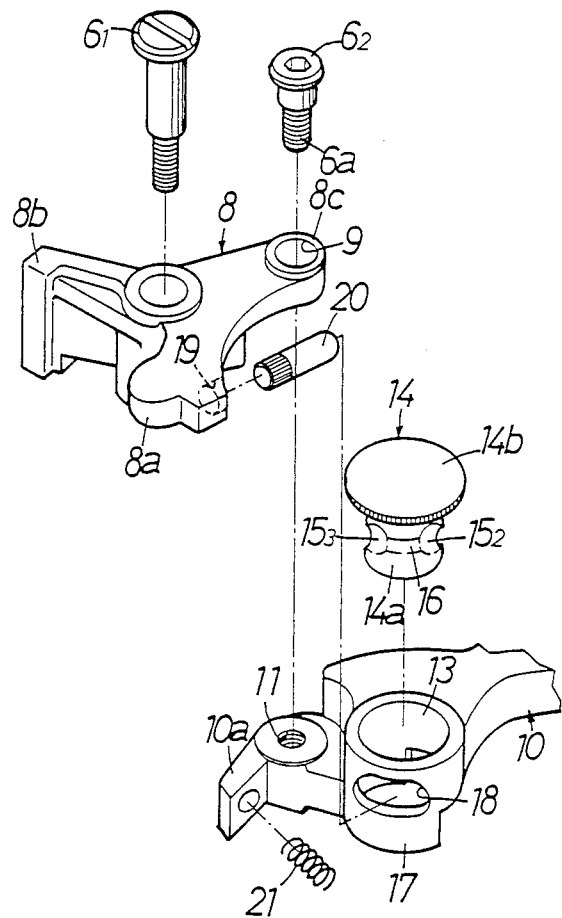

As clearly shown in FIGS. 1, 4 and 5, the operating element 8 includes an urging portion 8a bearing against an outer end face of the working piston 7, a restrict portion 8b adatped to abut against an outer peripheral surface of the master cylinder 4 to restrict the return position of the operating element 8 when a brake is inoperative, and a lever support portion 8c protruding ahead of the first support shaft $6_1$ with respect to the vehicle.

A second support shaft $6_2$ 2 is inserted through a through hole 9 in the lever support portion 8c in parallel to the first support shaft $6_1$, and has an external threaded portion 6a which is threadedly inserted into a threaded hole 11 in a fitting portion of an operating lever 10 superposed on a lower surface of the lever support portion 8c, as clearly shown in FIG. 2. This enables the operating lever 10 to be turned about the second support shaft $6_2$.

As clearly shown in FIGS. 1, 2, 4 and 5, an adjusting means 12 is interposed between the operating element 8 and the operating lever 10 for adjusting the distance between the operating lever 10 and the steering handle 1. The adjusting means 12 is constructed in the following manner.

A hole 13 is made in the fitting portion of the operating lever 10 behind the threaded hole 11 with respect to the vehicle, and a shank portion 14a of an adjusting element 14 is rotatably fitted into the hole 13. In addition, a pinching flange portion 14b integral with the shank portion 14a is placed on an upper opened end face of the hole 13. The shank portion 14a is provided with a plurality of, e.g., four (in the illustrated embodiment) recesses $15_1$ to $15_4$ of different depths at circumferentially uniformly spaced apart distances, and shallower recessed grooves 16 each connecting the adjacent recesses such as $15_1$ and $15_2$ to each other. An elongated hole 18 is circumferentially made in a hole 17 defining the hole 13 to face to a back surface of the urging portion 8a of the operating element 8. A pin hole 19 opened toward the elongated hole 18 is made in the back surface of the urging portion 8a of the operating element 8, and one end of an urging pin 20 which has been subjected to a knurling process is pressed into the pin hole 19. In an assembled state, the other end of the urging pin 20 is passed through the elongated hole 18 into the hole 13, with a semi-circular extremity thereof engaging one of the recesses $15_1$ to $15_4$ in the shank portion 14a, e.g., the fourthly deeper recess $15_4$ in the illustrated embodiment (see FIG. 1).

Between the first and second support shafts $6_1$ and $6_2$, a spring 21 is mounted in a compressed manner between the operating element 8 and a projecting portion 10a of the operating lever 10, so that a resilient force of the spring 21 allows the operating lever 10 to be urged against the operating element 8 through the adjusting element 14 and the urging pin 20.

As shown in FIG. 1, a line x-x extending through centers of the second support shaft $6_2$ and the adjusting element 14 and a line y—y extending through a center of the adjusting element 14 and through an axis of the urging pin 20 intersects each other at a substantially right angle. This enables suppression of a bending force on the urging pin 20.

With the above construction, when the operating lever 10 is pulled to the side of the throttle grip when braking, the operating element is turned clockwise as viewed in FIG. 1 about the first support shaft $6_1$ through the adjusting element 14 and the urging pin 20 to urge the working piston 7 in the master cylinder 4, thereby providing a braking.

In this case, the operating element 8 is turned together with the operating lever 10 and hence, the working stroke cannot be varied even if the second support shaft $6_2$ supporting the operating lever 10 is offset more forward of the vehicle than the first support shaft $6_1$.

To widen the distance between the operating lever 10 and the steering handle 1, the pinching flange 14b is turned clockwise as viewed in FIG. 1 and brought into engagement with the recess shallower than the recess $15_4$ which is now in engagement by the urging pin 20, e.g., the recces $15_1$. In this case, the semi-circular extremity of the urging pin 20 slides in the recessed groove 16, and this makes it possible to facilitate the disengagement of the urging pin 20 from the one recess $15_4$ and the engagement of the urging pin 20 with the other recess $15_1$. With the turning movement of the pinching flange 14, the operating lever 10 is turned counterclockwise as indicated by a broken line in FIG. 1 about the second support shaft $6_2$ while compressing the spring 21, so that the distance between the operating lever 10 and the steering handle 1 is widened.

If the support shafts $6_1$ and $6_2$ for the operating element 8 and the operating lever 10 are made separately as described above, the axial lengths of each of the support shafts $6_1$ and $6_2$ need not be increased as much even if the wall thicknesses of the fitting portions of the operating element 8 and the operating lever 10 are increased in order to improve the fitting strength of the operating element 8 and of the operating lever 10. This leads to a good appearance.

In addition, the operating element 8 and the adjusting means 12 can be assembled to the operating lever 10 to form a single unit and hence, it is possible to improve the ease of assembling the operating element 8, the operating lever 10 and the adjusting means 12 to the lever holder 5.

Figure 6:
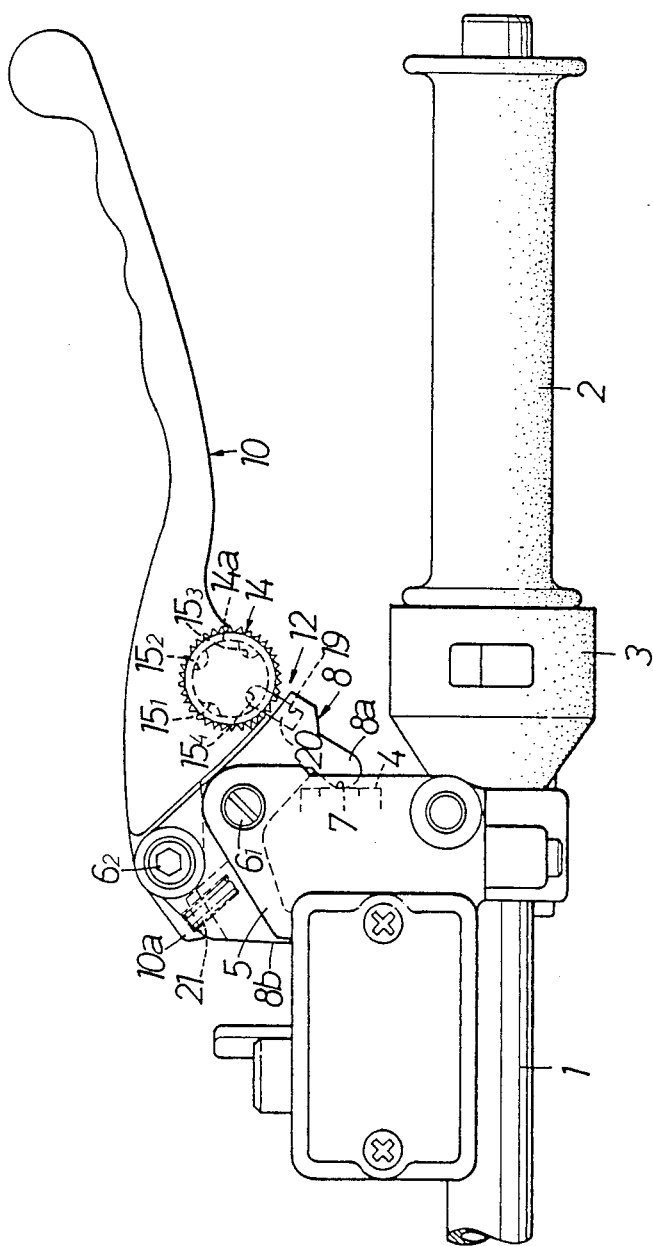
FIG. 6 illustrates a second embodiment in a general plan view similar to FIG. 1.

FIG. 6 illustrates a second embodiment of the present invention, which is of a construction similar to that of the previous embodiment, except that the second support shaft $6_2$ is displaced toward a longitudinal center line of a vehicle more than the first support shaft $6_1$, i.e., with an increased distance from the adjusting element 14. In the Figure, like characters designate the parts corresponding to those of the above first embodiment.

With such construction, when the distance between the operating lever 10 and the steering handle 1 is adjusted and the operating lever 10 is tuned about the second support shaft $6_2$, the difference between displacements of an outer little-finger touch portion and an inner index-finger touch portion in the operating lever 10 is reduced. This enables suppression of a variation in feeling of operation before and after adjustment of the distance.

A third embodiment of the present invention will now be described with reference to FIGS. 7 and 8. The third embodiment is of a construction similar to that of the abovedescribed first embodiment, except that a plurality of the pin holes are made in the operating element. Therefore, only the different portions will be described below. In the Figures, like characters denote the parts corresponding to those in the above-described first embodiment.

In this embodiment, a plurality of, e.g., two (in the illustrated embodiment) pin holes $19_1$ and $19_2$ opened toward the elongated hole 18 are made in the back surface of the urging portion 8a of the operating element 8 with different distances up to the second support shaft $6_2$ about which the operating lever 10 is turned. In the illustrated embodiment, one of the pin holes $19_2$ nearer to the second support shaft $6_2$ is shallower than the other pin hole $19_1$, and one end of the urging pin 20 is fitted into the deeper pin hole $19_1$. The other end of the urging pin 20 is passed through the elongated hole 18 with its semi-circular extremity engaging one of the recesses $15_1$ to $15_4$ in the shank portion 14a, e.g., the deepest recess $15_4$ in the illustrated embodiment.

Figure 7:
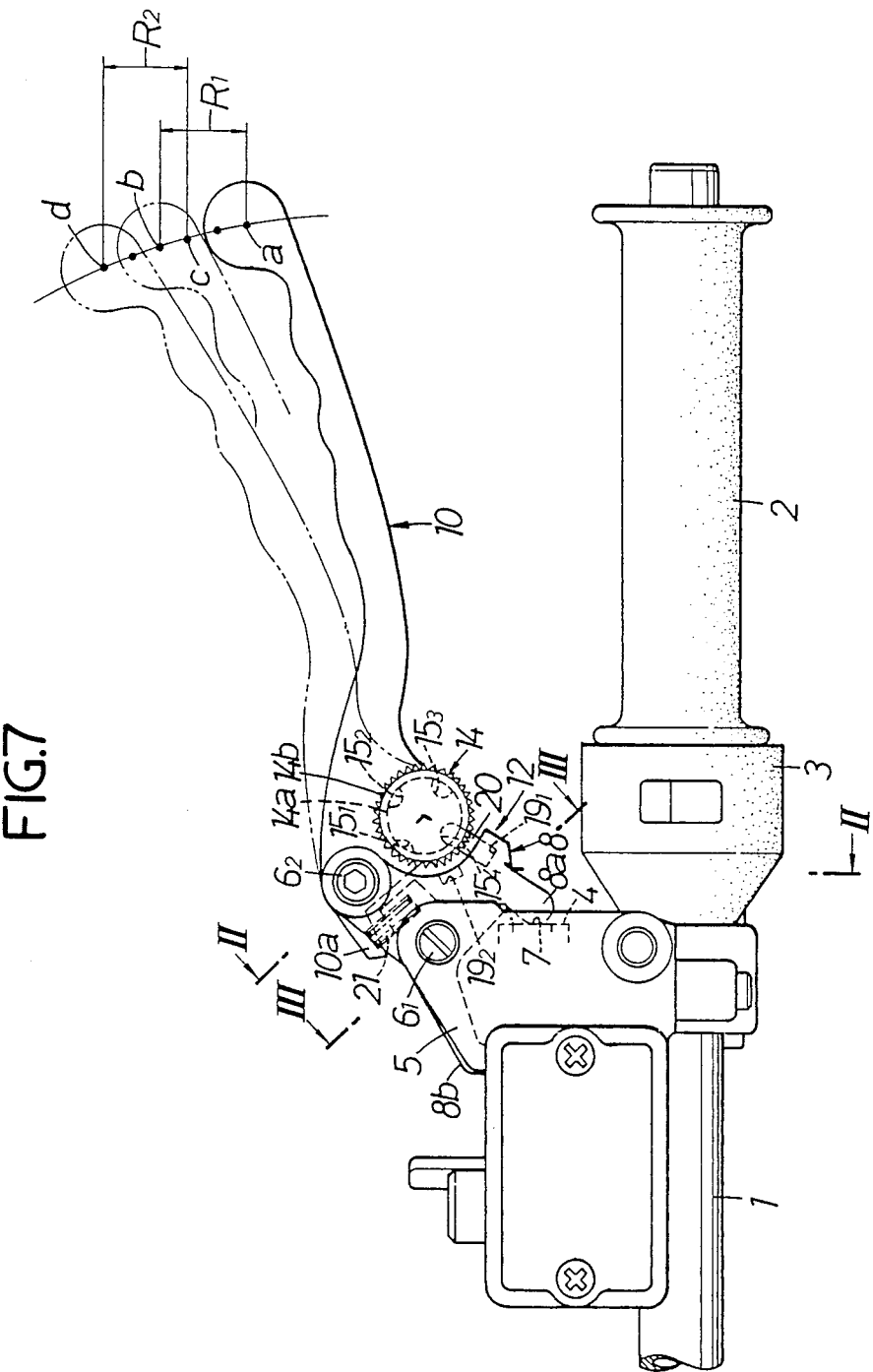
FIGS. 7 and 8 illustrate a third embodiment.
Figure 8:
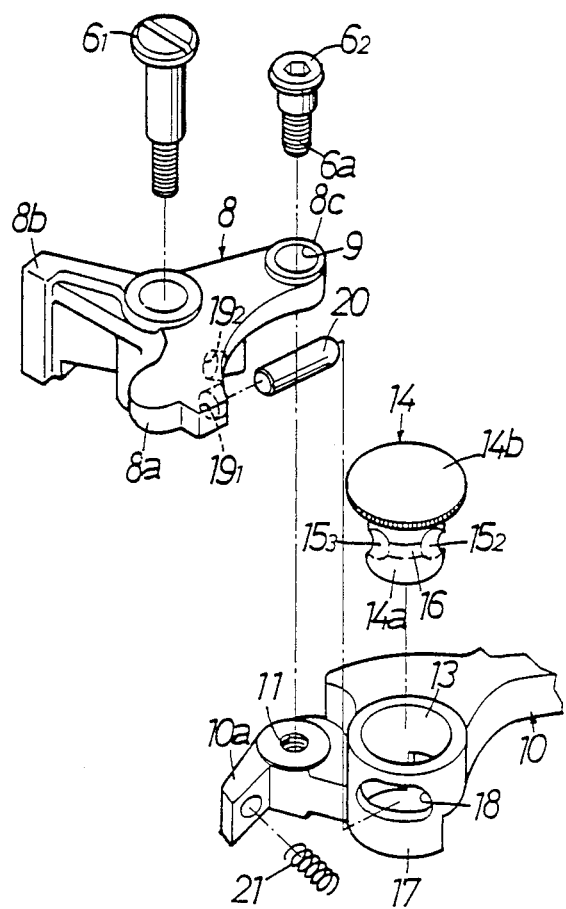

With such construction, when the urging pin 20 is in engagement with the deeper pin hole $19_1$, the position of the operating lever 10 can be changed in four stages over a range R1 from a position a to a position b respectively corresponding to the deepest recess $15_4$ and the shallowest recess $15_1$, as shown in FIG. 7, by a distance-adjusting procedure similar to that in the above-described first embodiment.

On the other hand, when the urging pin 20 has been fitted in the shallower pin hole $19_2$, the urging pin 20 engages the deepest recess $15_4$ in the adjusting element 14, so that a position c of the operating lever 10 nearest to the throttle grip 2 is a third stage position associated with the recess 15₂ in the above embodiment. Therefore, the position of the operating lever 10 can be changed in four stages over a range R2 from the position c to a position d.

In this manner, the distance adjusting range can be widened according to the number of the pin holes $19_1$ and $19_2$ in the operating element 8.

In addition, for this widening of the range, a simple means is employed, i.e., the two pin holes $19_1$ and $19_2$ are made in the operating element 8, and both the urging pin 20 and the adjusting element 14 are used in combination. Therefore, this widening of the range is economical and moreover, the urging pin 20 cannot be protruded in the front of the vehicle more than the operating lever 10. This leads to a good appearance around the operating lever 10, without reduction of the manipulatability of the operating lever 10.

What is claimed is

1. A lever system for vehicles, comprising an operating element for operating a master cylinder, an operating lever for actuating said operating element, said operating element and said operating lever being mounted on a lever holder attached to a steering handle, and an adjusting means interposed between said operating element and said operating lever for adjusting the distance between said operating lever and said steering handle, wherein said operating element is pivotally supported on said lever holder through a first support shaft, and said operating lever is pivotally supported on said operating element through a second support shaft; wherein said adjusting means comprises an adjusting element rotatably mounted in said operating lever and having a plurality of recesses of different depths made therein, a pin hole made in said operating element, and an urging pin having its one end fitted in said pin hole and having the other end adapted to be selectively engaged in one of said plurality of recesses.

2. A lever system according to claim 1, wherein a plurality of said pin holes of different depths are provided in said operating element to receive said urging pin, and said urging pin is adapted to be selectively fitted in one of said plurality of pin holes.

3. A lever system according to claim 1 or 2, wherein said plurality of recesses are provided in an outer periphery of a shank portion of said adjusting element and arranged in a line in a turning direction of said adjusting element, so that the recesses to be engaged by said urging pin are changed over from one to another by turning said adjusting element.

4. A lever system according to claim 1 or 2, wherein said urging pin engages said pin hole and said recess in a direction of turning operation of said operating lever, and a spring assisting in this engagement is interposed between said operating lever and said operating element.

5. A lever system according to claim 1 or 2, wherein said operating lever is turned together with said operating element about said first support shaft in a normal turning operation.

* * * * *